No. 118,810

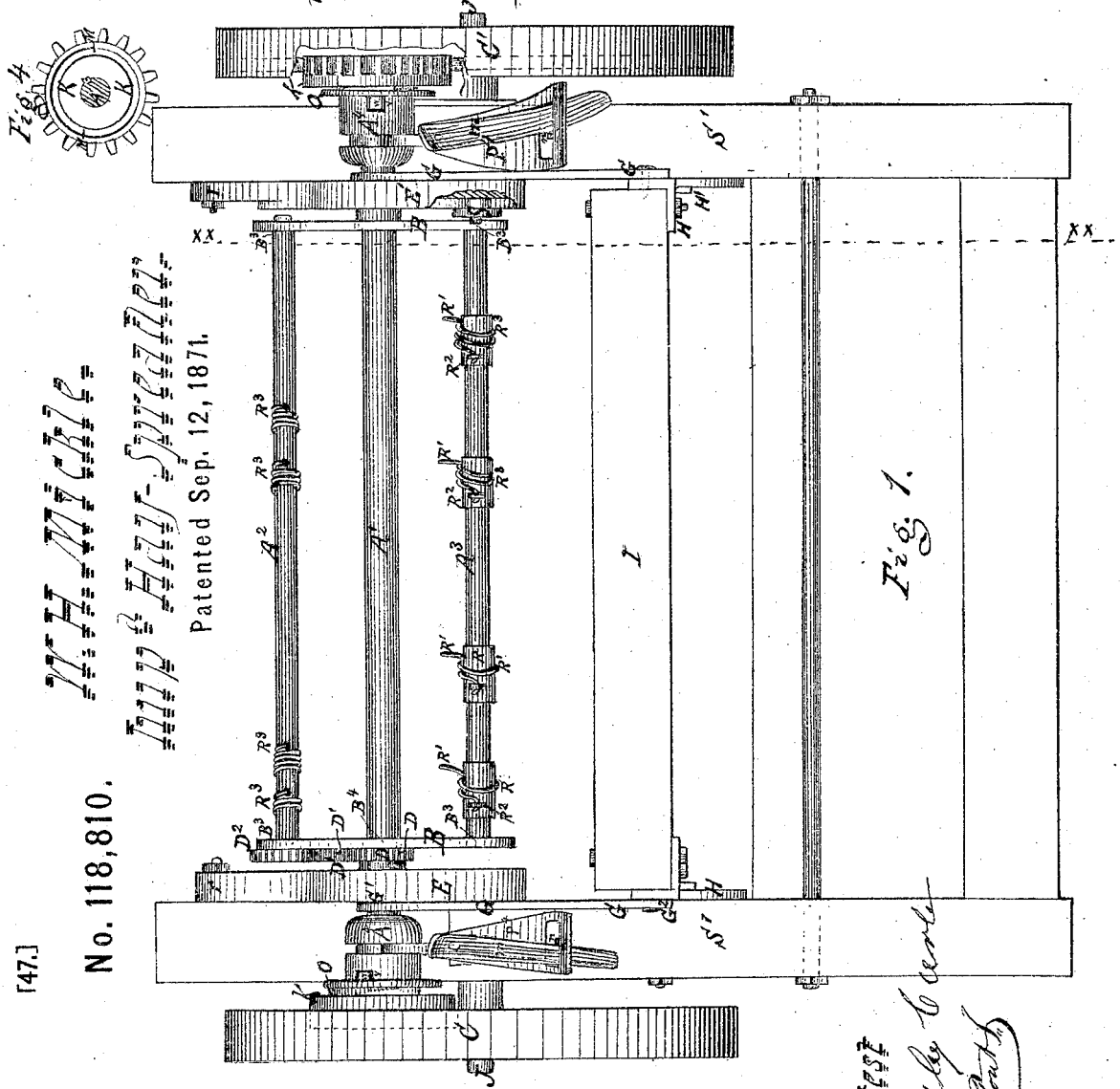

UNITED STATES PATENT OFFICE.

WILLIAM H. MICKLE, OF UTICA, NEW YORK.

IMPROVEMENT IN HAY-TEDDERS.

Specification forming part of Letters Patent No. 118,810, dated September 12, 1871; antedated August 24, 1871.

*To all whom it may concern:*

Be it known that I, WILLIAM H. MICKLE, of the city of Utica, in the county of Oneida and State of New York, have invented certain Improvements in Hay-Spreaders, of which the following is a specification:

The first part of my invention relates to the construction of a tine-shaft, and operating the same in the manner and by the combination of devices hereinafter described and specifically claimed. The second part of my invention relates to a combination of devices by means of which power is transmitted from the driving-wheels to the scatter-shaft, and by which the said shaft ceases to rotate when the machine is backed, all of which are more fully hereinafter described.

Figure 1 shows a top or plan view of a machine embracing my improvements; Fig. 2, an inner view of a cross-vertical section of that portion to the right of the line $x\ x$ in Fig. 1; Fig. 3, an outer-side view of that portion on the left side of that line. The last two figures, as well as those subsequently described, are on a reduced scale from Fig. 1. Fig. 4 shows an inner-end view of one of the pinions by which motion from the driving-wheels is communicated to the scatter-shaft $A^1$. Fig. 5 shows a side view of the driver, with spring, cross-section of shaft, and hub, and a side view of the binder. Fig. 6 shows an outer-end view of one of the clutches; Fig. 7, a plan view of the roller, with its crank and a part of the tine-shaft.

The construction of the main frame is obvious from the drawing, Fig. 1. The axles J J, upon which the carriage-wheels $c\ c'$ turn, are short, and extend through the side pieces $S^1\ S^1$ and the guide-plates E E'. The pinions K K mesh with the cogs on the interior of the rims of the wheel C C'. $P^4$ are the yokes which clasp the clutches $A^4\ A^4$ in the grooved recesses shown, and hold them in position, as described, while $m\ m$ are the levers by which the yokes are operated. The pinions turn on the shaft $A^1$. The shaft $A^3$ is the one upon which the tines are placed, and the arms B B hold these two shafts, as well as a third one, $A^2$, in their proper relative positions. It is shown in Figs. 1, 2, and 3 that the guide-piece E' on the right is provided with a circular groove in its inner face concentric with the disk itself, around in which the roller $S^2$ travels with its crank S on the shaft $A^3$; but this shaft is inserted through the disk eccentrically, and by means of these formations the peculiar rocking motion is given to the tine-shaft $A^3$ and the peculiar action before mentioned is given to the tines themselves—that is to say, the result of the rocking motion of shaft $A^3$, while it revolves around the scatter-shaft $A^1$, is such that the tines or teeth R' R' R' R' approach the direction of the radiuses to the shaft $A^1$ when nearing the ground, and recede from such direction as they rise in revolving, so that the centrifugal force and the force of gravitation combined will throw off the grass from the tines. In Fig. 2 is shown the projections $r\ r$ before mentioned, by means of which the scatter-shaft may be adjusted in height without interfering with the proper action of the machine. The shaft $A^2$, before mentioned, is provided with tines, and acts in a different manner from shaft $A^3$, but produces a similar result. It has a small pinion, $D^2$, on one end, and the guide E has a like pinion, D, just opposite to pinion $D^2$ and concentric with shaft $A^1$, and between these two is another pinion, marked $D^1$, which revolves upon an axle which is supported by an arm, B. The result of this gearing upon the action of the shaft $A^2$ is such that when it is made to revolve around the scatter-shaft $A^1$ it always presents the same side to the ground, and, consequently, if the tines are so placed upon it as to point toward the ground then they continue to do so always, although their shaft $A^2$ revolves around shaft $A^1$; such being the case the tines will allow the grass to slip off easily as required. The pinions K K, which are put in motion by the driving-wheels, are made with circular grooves M M on their inner ends or faces concentric with the pinions themselves. In these grooves the projection $P^1\ P^1$ of the binders P P, as shown in Fig. 5, with their points $P^2\ P^2$ pointing toward the shaft $A^1$, and then the drivers O O, are brought into contact with pinions K K on the same shaft in such a manner that the openings in the hubs O' O', as shown in Fig. 5, will admit the narrow ends $P^2\ P^2$ of binder to touch the shaft, as shown, and the point of the spring L will press against the binder and push it so far that it will become fast in the groove M, and the driver and pinion will move together so long as they move in that direction. When the pinion revolves in the direction in which the spring points, it will carry binder P, and thereby driver O, also; and if driver O be fastened to the shaft, or connected therewith by means of a clutch, it will rotate the shaft $A^1$ with it; but if the pinion K should rotate in an opposite direction it would not carry binder P with it. The projection on the binder P will slide easily in the groove. If spring L be reversed in position, then the operation will be in an opposite direction. The groove may be made in the driver O, and the devices that are shown upon it may be placed on the pinion K with similar results; or the groove may be in the binder, and a rim on the pinion or driver for the binder to work on. Instead of spring L a spring of any style or form that will press binders P so as to produce the effect that spring L does will do as well. The clutch $A^4$ is thrown in or out of connection with drivers O by the means before mentioned. The projection W on the driver and the slot V in the clutch are the means of such connection.

I claim as my invention—

1. The combination of the tine-shaft $A^3$, the crank S, roller $S^2$, and guide $E'$, constructed and operating substantially as and for the purpose described.

2. The combination of the driver O with binder P, pinion K, and shaft $A^1$, when each is constructed and all are operated substantially in the manner and for the purpose described.

W. H. MICKLE.

Witnesses:
RICHARD ADAMS,
MILO B. FENTON.